UNITED STATES PATENT OFFICE.

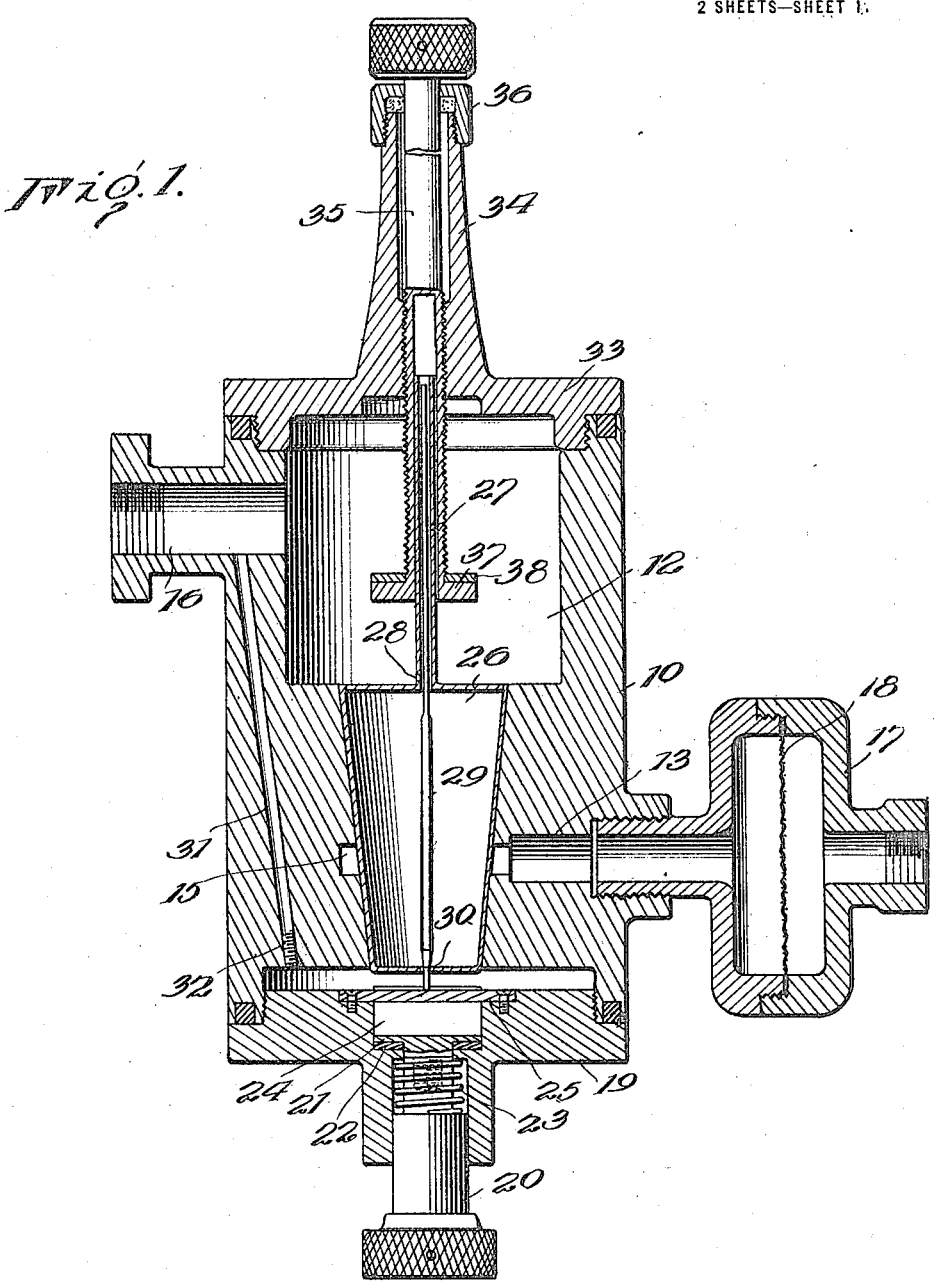

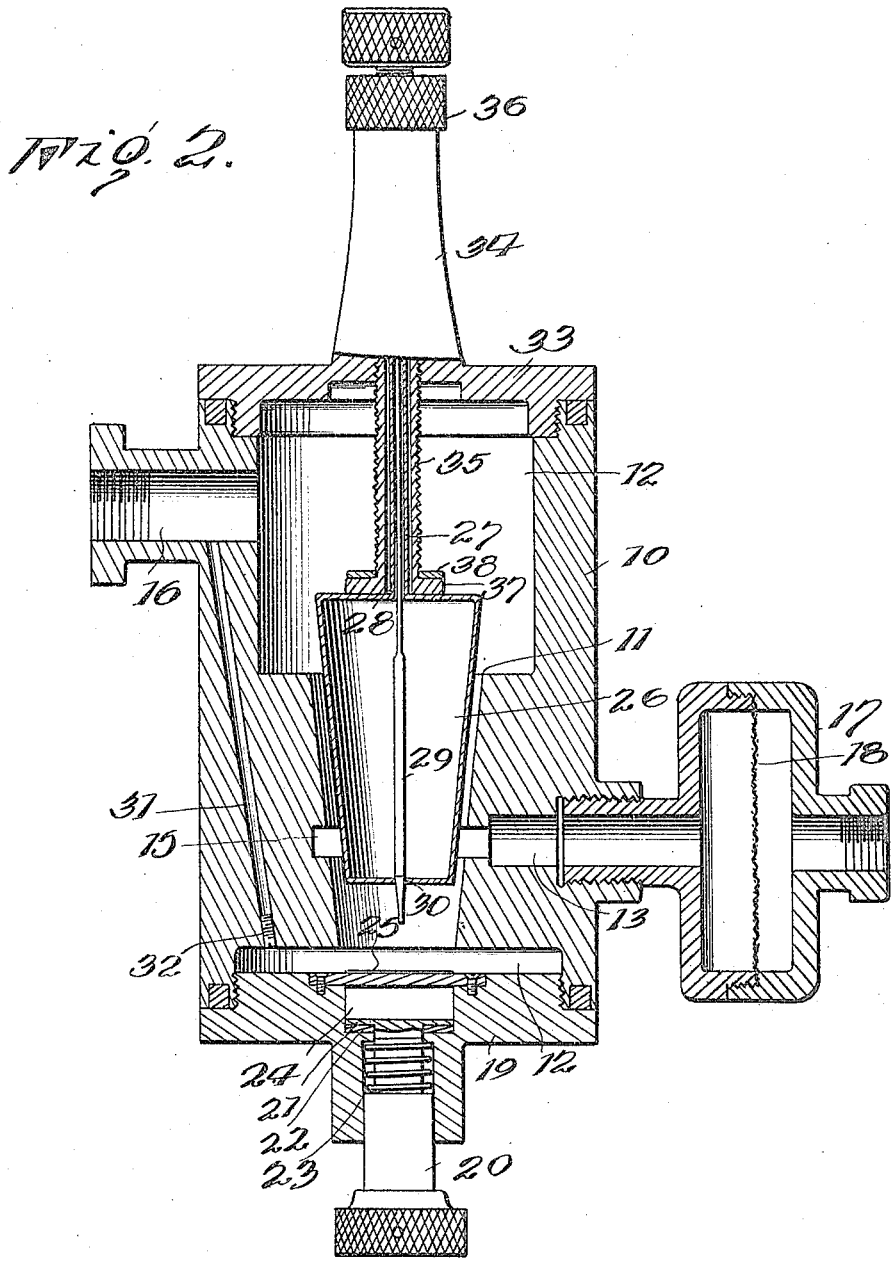

JAMES L. THOMPSON AND HARRY A. MURRAY, OF GREENSBURG, PENNSYLVANIA.

AUTOMATIC CUT-OFF VALVE AND PRESSURE-REGULATOR.

1,234,420.

Specification of Letters Patent.

Patented July 24, 1917.

Application filed August 15, 1916. Serial No. 115,027.

*To all whom it may concern:*

Be it known that we, JAMES L. THOMPSON and HARRY A. MURRAY, citizens of the United States, residing at Greensburg, in the county of Westmoreland and State of Pennsylvania, have invented certain new and useful Improvements in Automatic Cut-Off Valves and Pressure-Regulators, of which the following is a specification.

This invention contemplates an improved cut-off valve and pressure regulator and has as its primary object to provide a device of this character particularly designed for use in connection with fluid pressure systems and wherein the valve will automatically operate upon an interruption in the flow of the fluid to cut off a return flow thereof.

The invention has as a further object to provide a valve of this character wherein, upon the automatic movement of the valve to closed position, the valve will remain closed pending the manual opening thereof.

The invention has as a still further object to provide an arrangement wherein the throw of the valve may be regulated for controlling the flow of fluid through the valve as well as the fluid pressure.

The invention has as a still further object to provide an arrangement wherein the valve chamber will be automatically vented upon the movement of the valve to closed position so that the valve may shift to firmly engage its seat.

And a still further object of the invention is to provide an arrangement for equalizing the pressure around the valve when the valve is closed so that the valve will not bind against its seat.

Other and incidental objects will appear as the description proceeds and in the drawings wherein we have illustrated the preferred embodiment of the invention and wherein similar reference characters designate corresponding parts throughout the several views:

Figure 1 is a sectional view of the valve when in closed position, and

Fig. 2 is a similar view showing the valve open.

In carrying out the invention, a valve body 10 is employed which is provided axially with a frusto-conical or longitudinally tapered valve seat 11 communicating with a valve chamber 12. Leading into the valve chamber 12 at one side of the seat 11, is an inlet port 13 communicating at its inner extremity with an annular equalizing chamber 15 extending around the valve seat and opening into the valve chamber. Leading from the valve chamber 12, at its upper extremity, is an outlet port 16. Fitted into the inlet port 13 is a coupling 17 in which is arranged a strainer or screen 18.

Closing the valve chamber 12 at its lower extremity and detachably connected to the lower end of the valve body 10, is a closure plug or cap 19 which slidably receives a plunger 20 shiftable axially of the body 10. Screw threaded upon the inner extremity of the stem of the plunger is an annular head 21 normally arranged to seat within a suitable recess in the cap 19 with the inner face of the said head disposed substantially flush with the inner face of the said cap. Arranged upon the inner end of the head 21 is a packing washer 22. It will now be observed that the stem of the plunger is reduced adjacent the inner extremity thereof to receive a helical spring 23 surrounding the said stem and normally acting to hold the plunger in retracted position. Formed in the head 21 of the plunger is a diametrically arranged slot 24 substantially equal in depth to the throw of the plunger and freely received within this slot is a cross-strip 25 countersunk at its ends within the inner face of the cap 19 and detachably secured to the said cap by screws or other suitable fastening devices. As will be observed, the plunger is shiftable relative to the cross strip 25 when the said cross-strip will move within the slot 24 of the head of the said plunger.

Removably fitted in the valve chamber 12 to engage the seat 11 is a frusto-conical or longitudinally tapered hollow valve 26 adapted to shut off communication between the inlet and outlet ports 13 and 16 respectively. The valve 26 is shiftable axially of the valve body 10 to disengage the seat 11 and is provided, at its upper extremity, with an upwardly projecting hollow stem 27 having a vent opening 28 formed in the inner extremity thereof. Removably fitted through the stem 27 of the valve 26 to extend axially of the said valve, is a needle valve 29 gravitating to engage the seat of a valve opening 30 in the lower end of the valve 26 to normally close the vent passage through the said valve 26 between the said valve opening and the vent opening 28 in the stem 27 with the stem 27 acting as a centering stem for the needle valve. Leading from the lower extremity of the chamber 12 in the body 10 and communicating with the outlet port 16, is an auxiliary vent passage 31 normally closed at its lower end by a plug 32 screw threaded into the said passage.

Detachably connected to the upper end of the valve body 10 is a bonnet 33 provided with an axially arranged hollow stem 34. Adjustable through the stem 34 is a regulating screw 35, the stem 34, at its upper end, being provided with a packing nut 36 to receive the said screw. The screw 35, adjacent the inner end thereof, is hollowed out axially to freely receive the stem 27 of the valve 26 and provides a centering screw for the said valve. At its lower end, the screw 35 is formed with an annular head 37 for engagement with the valve 26 and mounted upon the said head is a suitable packing washer 38. As will now be clear, the screw 35 may be adjustably positioned for regulating the upward throw of the valve 26 away from its seat.

As previously intimated, the valve of the present invention is particularly designed for use in connection with fluid pressure systems such as a gas lighting system and will be interposed in a main service pipe. To permit a flow of gas, the plunger 20 is manually shifted to engage the head 21 thereof with the lower end of the valve 26 and lift the valve from its seat to assume a position substantially as illustrated in Fig. 2 of the drawings. The normal pressure of the system being first determined, the set screw 35 is then positioned to regulate the valve with extreme upward movement of the valve with respect thereto according to the maximum flow of gas desired, when the valve 26 will then automatically rise and fall within the limits of its movement according to the volume of the gas flow being used and will thus tend to equalize or make constant the gas pressure at the point of consumption of the gas. For instance, the valve when set to supply a certain number of gas jets, will tend to automatically regulate the gas pressure at the said jets according to the number of jets in use and thus equalize and maintain the pressure constant so that after the mixing valves of the said jets have been once properly regulated, the valve 26 will automatically act to maintain a constant pressure and flow of gas to the gas jets and thus insure proper combustion at all times. When the fluid pressure of such a system is normally very high, it is intended that the plug 32 be removed to provide an auxiliary vent for the valve chamber 12 upon the movement of the valve 26 to closed position.

When the valve 26 is lifted, the gas pressure in the service pipe will hold the valve away from its seat and permit a continuous flow through the valve body and in this connection, it will be noted that in the raised position of the valve 26, the needle valve 29 will gravitate to close the valve opening 30 in the valve 26 and prevent the escape of gas through the said valve at the vent opening 28. Should the gas pressure for any reason be interrupted, the valve 26 will then immediately gravitate to engage its seat 11, as shown in Fig. 1 of the drawings and shut off communication between the inlet and outlet ports of the valve body. When the valve 26 falls, the needle valve 29 will be moved to engage at its lower end with the cross strip 25 upon the cap 19 when the said cross strip will lift the needle valve away from its seat and vent the valve chamber 12 at its lower extremity through the valve 26 at the vent opening 28. The formation of an air cushion in the lower extremity of the valve chamber tending to retard the movement of the valve 26 to engage its seat or tending to prevent the valve 26 from properly seating is thus made impossible and it will accordingly be seen that we thus provide an arrangement wherein the valve 26 may quickly shift to shut off communication between the inlet and outlet ports of the valve body. Such arrangement forms a very important feature of the present invention as the valve is thus adapted for use in connection with fluid pressure systems wherein the fluid is subject to frequent extreme variations in pressure, since, upon an interruption of the gas pressure, the valve 26 will seat before a return of the pressure. In this connection, attention is directed to the provision of the equalizing chamber 15. This chamber being arranged to extend clear around the valve 26 when in closed position, will permit the gas from the service pipe to press equally against all sides of the valve so that the valve will not jam against one side of its seat and consequently stick.

It will therefor be seen that we provide a valve adapted to automatically operate for cutting off the flow of fluid therethrough and wherein the valve may be adjusted for regulating the pressure of the fluid passing through the said valve as well as the volume of fluid issuing from the valve. Furthermore, upon the movement of the valve to closed position, the said valve will remain in such position pending manual opening of the valve.

Having thus described our invention, what is claimed as new is:

1. A device of the character described including a valve body provided with a valve chamber and having inlet and outlet ports, a valve mounted in said chamber and gravitating to shut off communication between the said ports, a second valve carried by said first mentioned valve, and means arranged to coöperate with said second mentioned valve for automatically venting the valve chamber upon the movement of the said first mentioned valve to closed position.

2. A device of the character described including a valve body having a valve chamber and provided with inlet and outlet ports, a valve mounted in said chamber and gravitating to shut off communication between the said ports, the said valve being provided with a stem, means for adjustably regulating the movement of the valve to open position and slidably receiving said stem, and means for automatically venting the valve chamber upon the movement of the valve to closed position.

3. A device of the character described including a valve body having a valve chamber and provided with inlet and outlet ports, a valve mounted in said chamber and gravitating to shut off communication between the said ports, means adjustable upon the upper end of the valve toward the top of the valve for regulating the movement of the valve to open position and acting as a centering means for the valve, and means for automatically venting the valve chamber upon the movement of the valve to closed position.

4. A device of the character described including a valve body having a valve chamber and provided with inlet and outlet ports, a valve mounted in said chamber and gravitating to shut off communication between the said ports, and a second valve for automatically venting the valve chamber through the interior of said first mentioned valve upon the movement of the first mentioned valve to closed position.

5. A device of the character described including a valve body having a valve chamber and provided with inlet and outlet ports, a valve mounted in said chamber and gravitating to shut off communication between said ports, the valve being provided with a vent passage, means carried by the valve and gravitating to close said passage, and means carried by the valve body for engagement with said first mentioned means upon the movement of the valve to closed position for venting the valve chamber through said passage.

6. A device of the character described including a valve body having a valve chamber and provided with inlet and outlet ports, a valve mounted in said chamber and gravitating to shut off communication between said ports, the valve being provided with a vent passage, a needle valve carried by the said first mentioned valve and normally gravitating to close the said passage, and means carried by the valve body and arranged for engagement with the needle valve upon the movement of the said first mentioned valve to closed position for venting the valve chamber through the said passage.

7. A device of the character described including a valve body having a valve chamber and provided with inlet and outlet ports, a hollow valve mounted in said chamber and gravitating to shut off communication between the said ports, the said valve being provided with a vent passage therethrough, a needle valve gravitating upon the said first mentioned valve for normally closing the said passage, and means carried by the valve body for engagement with the needle valve upon the movement of the said first mentioned valve to closed position for venting the valve chamber through the said passage.

8. A device of the character described including a valve body having a valve chamber and provided with inlet and outlet ports, a hollow valve mounted in said chamber and gravitating to shut off communication between said ports, the said valve being provided with a stem and having a vent passage therethrough, a regulating screw for adjustably regulating the movement of the valve to open position and slidably receiving said stem, a needle valve gravitating within said first mentioned valve for normally closing the vent passage therethrough and slidably received by said stem, and means carried by the valve body for engagement with the needle valve upon the movement of the said first mentioned valve to closed position for venting the valve chamber through the said passage.

9. A device of the character described including a valve body having a valve chamber and provided with inlet and outlet ports, a valve mounted in said chamber and gravitating to shut off communication between the said ports, the valve being provided with a vent passage, a needle valve carried by said first mentioned valve and gravitating to normally close the said passage, means carried by the valve body for engagement with the needle valve upon the movement of the said first mentioned valve to closed position for venting the valve chamber through said vent passage, and manually operable means embracing said first mentioned means and movable with respect thereto for engagement with the said first mentioned valve to shift the valve to open position.

10. A device of the character described including a valve body having a valve chamber and provided with inlet and outlet ports, a valve mounted within said chamber and normally gravitating to shut off communication between the said ports, said valve being provided with a stem, and a second valve slidably received by said stem and operable for venting the valve chamber upon the movement of the said first mentioned valve to closed position.

11. A device of the character described including a valve body having a valve chamber and provided with inlet and outlet ports, a valve mounted within said chamber and normally tending to shut off communication between the said ports, a second valve movable with said first mentioned valve, and means carried by the valve body for engagement with said second mentioned valve for venting the valve chamber upon the movement of the said first mentioned valve to closed position.

12. A device of the character described including a valve body having a valve chamber and provided with inlet and outlet ports, a valve mounted within said chamber and normally tending to shut off communication between the said ports, a second valve movable with said first mentioned valve, a cap closing one end of the valve body, and means carried by said cap to engage said second mentioned valve for venting the valve chamber upon the movement of the said first mentioned valve to closed position.

13. A device of the character described including a valve body having a valve chamber and provided with inlet and outlet ports, a valve mounted within said chamber and normally tending to shut off communication between the said ports, a second valve movable with said first mentioned valve, a strip arranged to engage the said second mentioned valve for venting the valve chamber upon the movement of the said first mentioned valve to closed position, and a plunger movable relative to the said strip for shifting the said first mentioned valve to open position.

14. A device of the character described including a valve body having a valve chamber and provided with inlet and outlet ports, there being an equalizing chamber extending around the valve seat and communicating with the inlet port at a point intermediate the ends of the valve seat and with the valve chamber, and a valve mounted within the valve chamber and movable to shut off communication between the said ports with the valve closing said equalizing chamber with respect to the valve chamber and with the said equalizing chamber surrounding the valve.

15. A device of the character described including a valve body having a valve chamber and provided with inlet and outlet ports, a valve mounted within said chamber and normally tending to shut off communication between the said ports, and means for automatically venting the valve chamber upon the movement of the valve to closed position, the valve body being provided with an auxiliary vent passage communicating with the said outlet port and with the valve chamber below the said valve at a point spaced from the valve seat.

In testimony whereof we affix our signatures.

JAMES L. THOMPSON. [L. S.]
HARRY. A. MURRAY. [L. S.]

Copies of this patent may be obtained for five cents each, by addressing the "Commissioner of Patents, Washington, D. C."